US012771613B2

(12) United States Patent
Wilson et al.

(10) Patent No.: US 12,771,613 B2
(45) Date of Patent: Oct. 20, 2026

(54) SYSTEMS AND METHODS FOR AI/ML-BASED CRYPTOGRAPHY ANALYSIS AND REMEDIATION

(71) Applicant: Verizon Patent and Licensing Inc., Basking Ridge, NJ (US)

(72) Inventors: Stuart Wilson, York (GB); Lee E. Sattler, Mount Airy, MD (US); Ronald Ayres, Dundalk (IE); Said Soulhi, Saint Cloud, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 97 days.

(21) Appl. No.: 18/790,559

(22) Filed: Jul. 31, 2024

(65) Prior Publication Data

US 2026/0039556 A1 Feb. 5, 2026

(51) Int. Cl.
*G06F 15/173* (2006.01)
*H04L 41/12* (2022.01)
*H04L 41/16* (2022.01)

(52) U.S. Cl.
CPC .............. *H04L 41/12* (2013.01); *H04L 41/16* (2013.01)

(58) Field of Classification Search
CPC ................................ H04L 41/12; H04L 41/16
See application file for complete search history.

(56) References Cited

U.S. PATENT DOCUMENTS 5,619,576 A 4/1997 Shaw
11,550,961 B1 1/2023 Horesh
11,727,829 B1 8/2023 Arbajian
11,838,410 B1 12/2023 Ramanathan
11,991,299 B1 * 5/2024 Rosenoer ................. H04L 9/50
12,184,772 B1 12/2024 Belchee (Continued)

FOREIGN PATENT DOCUMENTS

WO 2013/171507 11/2013

OTHER PUBLICATIONS

Barker, et al., “Recommendation for Key-Derivation Methods in Key-Establishment Schemes”, NIST Special Publication 800-56C, Revision 2, Aug. 2020, 41 Pages.

(Continued)

*Primary Examiner* — Padma Mundur

(57) ABSTRACT

A device described herein may maintain a set of models that associate a plurality of sets of input cryptography configurations with respective sets of output cryptography configurations; receive information indicating a first set of cryptography configurations associated with a particular system; compare the first set of cryptography configurations with one or more sets of input cryptography configurations of the set of models; identify, based on the comparing, a particular set of input cryptography configurations included in the set of models; identify a particular set of output cryptography configurations that are indicated in the set of models as being associated with the identified particular set of input cryptography configurations; and provide the particular set of output cryptography configurations to the particular system, wherein the particular system modifies or replaces the first set of cryptography configurations with the particular set of output cryptography configurations.

20 Claims, 6 Drawing Sheets

(56) References Cited

U.S. PATENT DOCUMENTS

| | | | | |
|---|---|---|---|---|
| 12,200,105 | B1 | 1/2025 | Kampanakis | |
| 12,499,153 | B1 | 12/2025 | Neale | |
| 2006/0212936 | A1 | 9/2006 | Berzanskis | |
| 2018/0159684 | A1 | 6/2018 | Roth | |
| 2022/0294620 | A1 | 9/2022 | Jho | |
| 2022/0353061 | A1 | 11/2022 | Pala | |
| 2024/0121080 | A1 | 4/2024 | Miller | |
| 2025/0156748 | A1 | 5/2025 | Rajagopalan | |
| 2025/0211979 | A1 | 6/2025 | Mutheevi | |
| 2025/0274787 | A1* | 8/2025 | Frei ........................ | H04W 24/06 |

OTHER PUBLICATIONS

Wenger, et al., "SALSA: .Attacking Lattice Cryptography with Transformers", Cryptology ePrint Archive, Paper 2022/935, available at https://eprint.iacr.org/2022/935.pdf (2022).

* cited by examiner

SYSTEMS AND METHODS FOR AI/ML-BASED CRYPTOGRAPHY ANALYSIS AND REMEDIATION

BACKGROUND

Networks provide for connectivity between different types of devices, such as application servers, client devices, cloud systems, etc. Cryptographic techniques may be used to secure access to such devices, communications between such devices, and/or to otherwise protect the networks and/or devices that communicate via networks. The cryptographic techniques may include encryption techniques, key-based authentication techniques, or the like. Some cryptographic techniques may be more resilient or "hack-proof" than others. Additionally, some cryptographic techniques may have less stringent hardware or processing requirements than others. Additionally, modifying or migrating cryptography configurations promptly and without impact to surrounding infrastructure may be difficult or laborious due to factors such as non-standardized configurations, cryptographic algorithm or protocol support, lack of automated configuration techniques, etc.

DETAILED DESCRIPTION OF EXAMPLE EMBODIMENTS

The following detailed description refers to the accompanying drawings. The same reference numbers in different drawings may identify the same or similar elements.

Embodiments described herein provide for the automated collection, analysis, and refinement of cryptographic techniques used in a network. For example, as discussed below, artificial intelligence/machine learning ("AI/ML") techniques or other suitable automated techniques may be employed in order to identify or classify cryptography techniques utilized by networks or systems, to identify possible attack vectors to which such cryptographic techniques may be vulnerable, relationships or dependences of such cryptographic techniques, or the like. A cryptographic ontology of a given system (e.g., a network, device, or group of devices) may accordingly be generated, where such ontology represents types, properties, interrelationships, etc. of cryptographic techniques used by the system. Additionally, capabilities of the system may be determined, such as hardware capabilities (e.g., quantity of processors, memory capacity, storage space, quantum computing capability, etc.). Furthermore, other aspects of the system may be determined, such as Quality of Service ("QoS") requirements, Service Level Agreements ("SLAs"), performance thresholds, etc.

In accordance with some embodiments, the cryptographic ontology of a given system may be analyzed using AI/ML techniques or other automated techniques, in order to identify potential configuration modifications to the system, including modifications to cryptographic techniques used by the system (e.g., updates to the cryptographic techniques, different cryptographic techniques, modifications to parameters of the crypto techniques such as higher bit encryption techniques, etc.). Determining the modifications based on the capabilities of the system may ensure that the modifications are compatible with the system (e.g., do not exceed the capabilities of the system). Additionally, determining the modifications based on QoS requirements, SLAs, etc. of the system may ensure that the performance the system is not negatively impacted or degraded when implementing such modifications. In this manner, the cryptographic techniques used by the system, and accordingly the security of the system, may be optimized in an automated manner.

Figure 1:
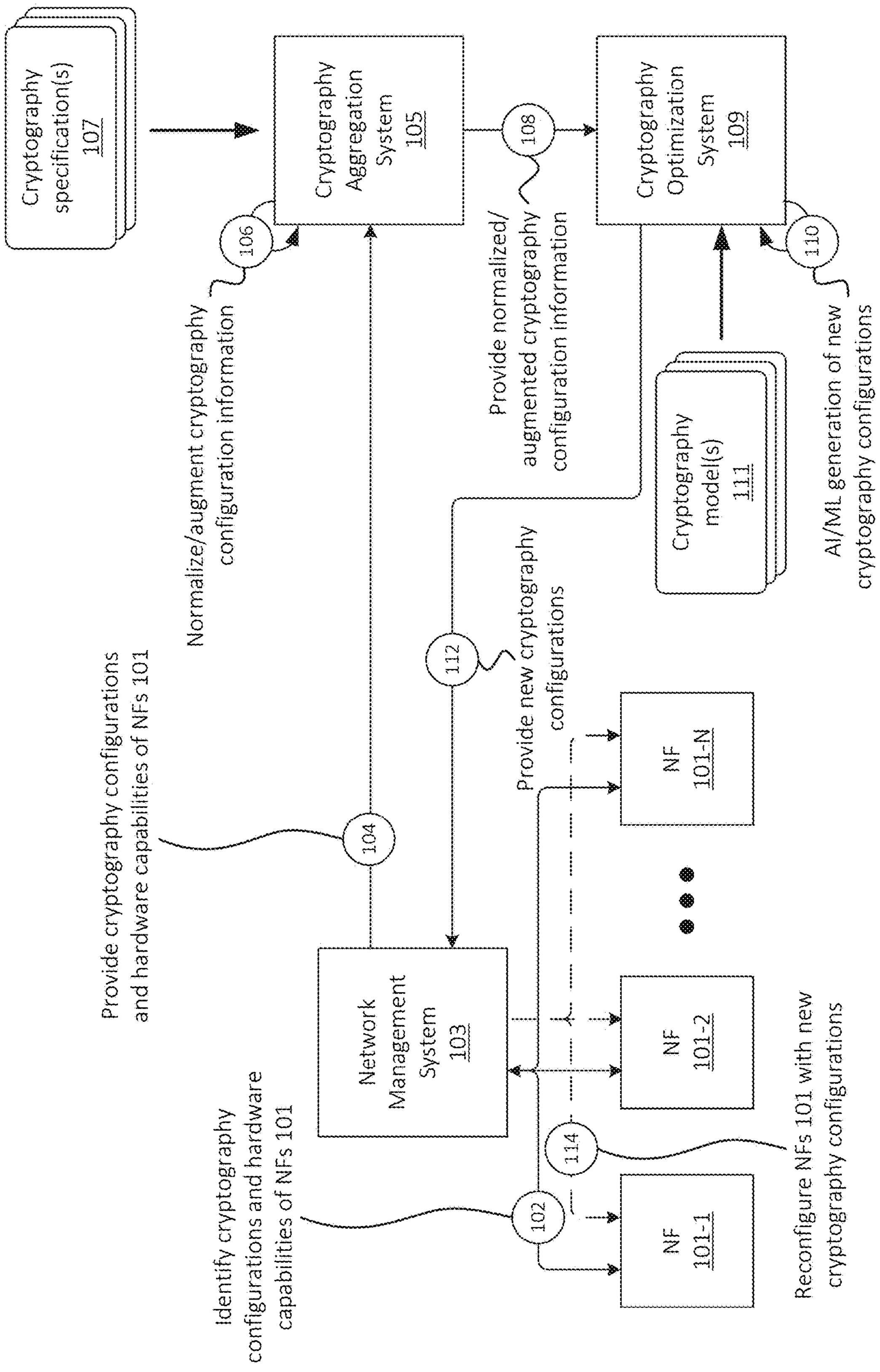
FIG. 1 illustrates an example overview of one or more embodiments described herein.

As shown in FIG. 1, for example, a set of devices (e.g., Network Functions ("NFs") 101 such as NFs 101-1, 101-2, and 101-N), may be communicatively coupled to Network Management System ("NMS") 103. As discussed below, NFs 101 may include different types of NFs that each perform respective operations that facilitate the wireless network to provide connectivity between devices (e.g., User Equipment ("UEs"), server devices, or the like) and/or other networks. Such operations may include, for example, managing access to the network, establishing and/or enforcing QoS policies and/or SLAs, routing user plane traffic, providing location services, etc. While discussed in the context of a wireless network that includes NFs 101 and NMS 103, embodiments described herein may be implemented in different kinds of networks and/or with different types of devices or systems.

NMS 103 may perform operations such as configuring NFs 101, instantiating and/or de-instantiating NFs 101 (e.g., in environments where NFs 101 are implemented in a virtualized and/or a containerized manner), monitoring Key Performance Indicators ("KPIs") or metrics associated with NFs 101, or the like. In some implementations, NMS 103 and/or NFs 101 may implement cryptography techniques in order to secure access to NFs 101, to authenticate NFs 101 and/or NMS 103, to secure communications between NFs 101 and/or NMS 103, and/or to otherwise provide security to the network that includes NFs 101 and NMS 103.

Securing access to a given NF 101 may include, for example, verifying that an entity attempting to access a given NF 101 is authorized to access the given NF 101. For example, NMS 103 and NF 101 may participate in a cryptographic authentication technique, such as a key exchange technique (e.g., a Diffie-Hellman key exchange technique, a Public Key Infrastructure ("PKI") technique, a Key Escrow Server ("KES")-based technique, or the like), an authentication token-based technique, and/or some other suitable authentication technique that employs cryptographic operations.

Authenticating communications between NFs 101 and/or NMS 103 may include using cryptographic techniques, such as cryptographic keys, authentication tokens, etc., to verify that communications received from a given NF 101 are in fact from the given NF 101 as opposed to from some other source. Securing communications between NFs 101 and/or NMS 103 may include utilizing cryptographic encryption techniques, such as a Secure Hashing Algorithm ("SHA")

encryption technique, a Secure Sockets Layer ("SSL") encryption technique, an Advanced Encryption Standard ("AES") encryption technique, etc.

Each NF 101 may be configured with particular application programming interfaces ("APIs"), software development kits ("SDKs"), libraries, firmware, etc., which may be associated with implementing cryptographic security techniques for authentication, authorization, encryption, etc. For example, NMS 103 may configure each NF 101, and/or some other suitable device or system may configure each NF 101, with such APIs, SDKs, libraries, etc.

As shown, NMS 103 may identify (at 102) cryptography configurations and hardware capabilities of NFs 101. For example, as noted above, NMS 103 may perform operations to configure some or all NFs 101 with particular cryptography configurations, such as installing, updating, instantiating, deploying, etc. particular APIs, SDKs, firmware, keys, tokens, encryption algorithms, etc. on NFs 101. Additionally, or alternatively, NMS 103 may communicate with some or all NFs 101 to identify APIs, SDKs, firmware, keys, tokens, encryption algorithms, etc. that have been installed on, instantiated on, implemented by, etc. some or all NFs 101.

NMS 103 may further identify hardware capabilities, configurations, etc. of NFs 101. For example, NMS 103 may identify types of hardware resources (e.g., "bare metal" machines, virtual machines, cloud systems, etc.) that implement particular NFs 101, hardware resource monitoring parameters such as available or used storage space, available or used memory, available or used network bandwidth, or the like. Additionally, NMS 103 may identify hardware resource parameters such as quantity or type of processors of devices that implement NFs 101, types or amounts of memory or storage space of devices that implement NFs 101, or the like. Similarly noted above, in some embodiments, NMS 103 may identify QoS policies, SLAs, performance thresholds, etc. (referred to simply as "QoS parameters" for the sake of brevity) associated with some or all NFs 101. In this manner, NMS 103 may identify (at 102) cryptography configurations, hardware capabilities, and/or QoS parameters of some or all NFs 101 of a wireless network. In some embodiments, NMS 103 may monitor some or all NFs 101 in real time or near-real time (e.g., on an ongoing basis) in order to maintain up-to-date cryptography configuration information associated with some or all NFs 101.

NMS 103 may provide (at 104) information to Cryptography Aggregation System ("CAS") 105, indicating the cryptography configurations and/or the hardware capabilities of some NFs 101. In some embodiments, CAS 105 may further receive, maintain, etc. one or more cryptography specifications 107. Cryptography specifications 107 may, for example, include parameters, conditions, attributes, markers, flags, etc. associated with various cryptography techniques. CAS 105 may, for example, compare cryptography configuration information received from NMS 103 (e.g., cryptography configuration information associated with a particular NF 101) to one or more cryptography specifications 107, to determine a particular matching cryptography specification 107. For example, NMS 103 may provide (at 104) the cryptography configuration information in a non-standardized or an unstructured manner, and CAS 105 may utilize AI/ML techniques, similarity analysis techniques, or other suitable techniques in order to correlate cryptography configuration information, received from NMS 103 and associated with the particular NF 101, with a particular cryptography specification 107. The particular cryptography specification 107 may include, for example, a name, a version number, a classification, and/or one or more other parameters associated with one or more particular cryptography techniques. In this sense, NMS 103 (and/or other devices or systems with which CAS 105 communicates in a similar manner) does not need to format the cryptography configuration information for any given NF 101, prior to outputting the cryptography configuration information to CAS 105. That is, CAS 105 may be "plug and play" with respect to any suitable type of device or system that provides cryptography configuration information in a non-standardized and/or unstructured format.

CAS 105 may, in some embodiments, normalize and/or augment (at 106) the cryptography configuration info, received from NMS 103, based on cryptography specifications 107. For example, CAS 105 may add tags or labels, reformat some or all of the received cryptography configuration information, etc. based on an identified (e.g., matching) cryptography specification 107. In this sense, although the cryptography configuration information received from NMS 103 may be unstructured or in a non-standard format, structured and/or normalized cryptography information may be produced (e.g., as derived from or included in a matching cryptography specification 107) that represents the cryptography configuration of some or all NFs 101. The structured and/or normalized cryptography information, generated by CAS 105, may include tags, labels, etc., such as the name or version of a given API, SDK, cryptography technique, etc. employed by some or all NFs 101.

In some embodiments, CAS 105 may identify further attributes of cryptography configurations implemented by some or all NFs 101. For example, CAS 105 may identify dependencies, constraints, etc. associated with such cryptography configurations. Dependencies may include cryptography techniques used to secure communication pathways between different NFs 101, such as a particular set of keys, tokens, etc. that are used for securing communications between two or more different NFs 101. In some scenarios, dependencies or constraints may include information indicating such communication pathways themselves, such as network interfaces, Service-Based Interface ("SBIs"), or the like. In some embodiments, identifying a dependency or constraint may include identifying authentication keys, certificates, etc. that are used by specific NFs 101 or types of NFs 101 (e.g., where the presence of a given key, certificate, etc. signifies that a particular NF 101 may use such key, certificate, etc. to securely communicate with another particular NF 101).

As noted above, different types of devices or systems may communicate with CAS 105 via a unified interface, API, etc. implemented by CAS 105, via which such different types of devices or systems may provide differently formatted, unstructured cryptography configuration information, without the need to implement a mechanism by which such configuration information is formatted or normalized into a unified and portable ontology. That is, CAS 105 may generate a cryptographic ontology associated with NMS 103 and/or one or more NFs 101, and may similarly generate cryptographic ontologies for multiple systems that provide cryptography information in diverse or unstructured formats.

In some embodiments, the cryptography ontology for a given system (e.g., for NMS 103 and/or some or all NFs 101) may include the normalized and/or augmented cryptography information (e.g., as generated or determined by CAS 105). In some embodiments, the cryptography ontology for the given system may further include hardware capability information, QoS parameters, and/or other suitable information associated with some or all elements of the system (e.g., hardware capability information and/or QoS parameters associated with one or more NFs 101 and/or of NMS 103).

CAS 105 may, in some embodiments, provide (at 108) the normalized and/or augmented cryptography information to Cryptography Optimization System ("COS") 109. For example, in some embodiments, COS 109 may receive the cryptography ontology, including hardware capabilities of NFs 101 and/or NMS 103. COS 109 may also receive, maintain, refine, etc. one or more cryptography models 111. In some embodiments, cryptography models 111 may include values, variables, categories, etc. that are in a same format as the ontology as generated by CAS 105. In this sense, in some embodiments, the normalizing and/or augmentation (e.g., generation of the cryptography ontology) may include reformatting or otherwise augmenting the cryptography configuration information, received from NMS 103, into a format that is compatible with one or more cryptography models 111.

Cryptography models 111 may include, in some embodiments, cryptography configurations that have been optimized for factors such as increased security, reduced resource consumption (e.g., reduced processor consumption, reduced memory consumption, reduced network bandwidth consumption, etc.), compliance with regulations or information technology ("IT") policies, etc. For example, COS 109 and/or some other suitable device or system may utilize AI/ML techniques or other suitable techniques to automatically refine different cryptography configurations (e.g., hundreds, thousands, millions, etc. of cryptography configurations) that have been determined as being optimal for one or more factors. In some embodiments, for example, a first set of cryptography models 111 may be optimized for increased security (e.g., reduced risk of attack or malicious access), a second set of cryptography models 111 may be optimized for reduced resource consumption, a third set of cryptography models 111 may be optimized for a blend of increased security and reduced resource consumption, and so on.

In some embodiments, each cryptography model 111 may include a score, value, indicator, etc. of such optimization factors. For example, a first cryptography model 111 (e.g., a first set of cryptography configurations) may include a relative high score for security (e.g., increased difficulty to "hack" or "crack," reduced risk of attack or malicious access, etc.) and a relative low score for resource consumption and/or performance (e.g., cryptography configurations indicated in such cryptography model 111 may be relatively time-consuming or resource-intensive to implement). As another example, a second cryptography model 111 may include a relatively lower score for security and a relatively higher score for resource consumption and/or performance.

In some embodiments, COS 109 may perform one or more training operations in order to generate one or more cryptography models 111 (e.g., in order to associate particular sets input cryptography configurations with particular respective sets of output cryptography configurations, to score or classify such cryptography models 111, etc.). COS 109 may, for example, perform simulations of different cryptography configurations to determine measures of security, resource consumption, or other factors or metrics. In some embodiments, the simulations may be performed on different types of hardware resources with different hardware capabilities, and/or such different hardware capabilities may be simulated as well. Additionally, or alternatively, COS 109 may perform one or more other types of training operations, such as supervised learning, unsupervised learning, etc.

In some embodiments, a given cryptography model 111 may include a set of inputs and a set of outputs. The set of inputs may be specified in terms of conditions, criteria, etc., which COS 109 may compare to a given cryptography ontology (e.g., as provided by CAS 105) associated with a given system (e.g., NMS 103 and/or NFs 101). The set of outputs may include a modified or different set of cryptography configuration information (e.g., a different cryptography ontology) that is more optimal than a current cryptography ontology in one or more respects (e.g., increased security, reduced resource consumption, etc.).

Cryptography models 111 may accordingly correlate respective sets of outputs (e.g., remediation actions such as modifying cryptography techniques such as the use of particular algorithms or cryptography techniques, modifying cryptography parameters such as quantity of bits used for encryption, or the like) with respective sets of inputs (e.g., current cryptography configurations of NFs 101 and/or NMS 103). COS 109 may utilize AI/ML techniques such as neural networks, K-means clustering, and/or other suitable AI/ML techniques to determine the correlations between particular sets of outputs and particular sets of inputs. In this manner, COS 109 may be able to use cryptography model 111 to identify or generate (at 110) a particular cryptography model 111 and/or a particular set of outputs (e.g., a modified or new cryptography configuration) to apply when given a particular set of inputs (e.g., a current cryptography ontology of a system that includes NMS 103 and/or NFs 101, and/or a current cryptography configuration of NMS 103 and/or one or more NFs 101).

In some embodiments, COS 109 may perform a similarity analysis to associate a particular cryptography ontology (e.g., a cryptography configuration of NMS 103 and/or one or more NFs 101) with a particular set of inputs of one or more cryptography models 111. For example, COS 109 may perform such analysis in order to identify a particular model 111, and/or a set of inputs of one or more models 111, that "match" the current cryptography ontology. The "match" may include an exact match, and/or may include "closest" match (e.g., where the similarity analysis yields a particular model 111 or set of inputs of one or more models 111 that are associated with a highest measure of similarity in accordance with the similarity analysis).

In some embodiments, a particular input may be associated with multiple different outputs, with differing weights applied to reflect different sets of hardware resources that may be implemented. For example, one set of output cryptography configurations may be associated with a given input cryptography configuration with a first set of hardware capabilities, while a second set of output cryptography configurations may be associated with the same given input cryptography configuration with a different second set of hardware capabilities. That is, for example, a first set of hardware resources that includes the first set of hardware capabilities may be a better fit for the first set of output cryptography configurations, while a second set of hardware resources that includes the second set of hardware capabilities may be a better fit for the second set of output cryptography configurations. In one scenario, the second set of output cryptography configurations may have steeper hardware requirements (e.g., may be more processor-intensive, may be more memory-intensive, etc.), and may not be feasible to ultimately implement on lesser hardware (e.g., the first set of hardware resources in this example).

COS 109 may provide (at 112) the newly identified or generated cryptography configurations to NMS 103. For example, COS 109 may communicate with NMS 103 via an API or some other suitable communication pathway. Additionally, or alternatively, COS 109 may provide (at 112) the new cryptography configurations to CAS 105, which may in turn provide such cryptography configurations to NMS 103 (e.g., via the same communication pathway used by NMS 103 and CAS 105 to communicate with each other at 104).

NMS 103 may accordingly implement (at 114) the reconfiguration of NMS 103 and/or NFs 101 based on the provided cryptography configurations. For example, as noted above, the new cryptography configurations may include different versions (e.g., updated versions) of libraries, applications, operating systems, firmware, etc. implemented by NMS 103 and/or NFs 101. In some implementations, new cryptography configuration may include a set of authentication keys, certificates, etc. NMS 103 may, for example, install, instantiate, etc. such libraries, applications, keys, certificates, etc. at NMS 103 and/or one or more NFs 101. As another example, the new cryptography configurations may include parameters (e.g., quantity of bits used for encryption) that may be provided to NFs 101, where NFs 101 may implement updated cryptography configurations by updating such parameters. In some embodiments, the new cryptography configurations may include one or more other types of updates, configurations, etc. that may be used to implement enhanced cryptography techniques to secure access to NFs 101, to secure communications between NFs 101, and/or to otherwise increase the security of the system that includes NMS 103 and NFs 101.

Figure 2:
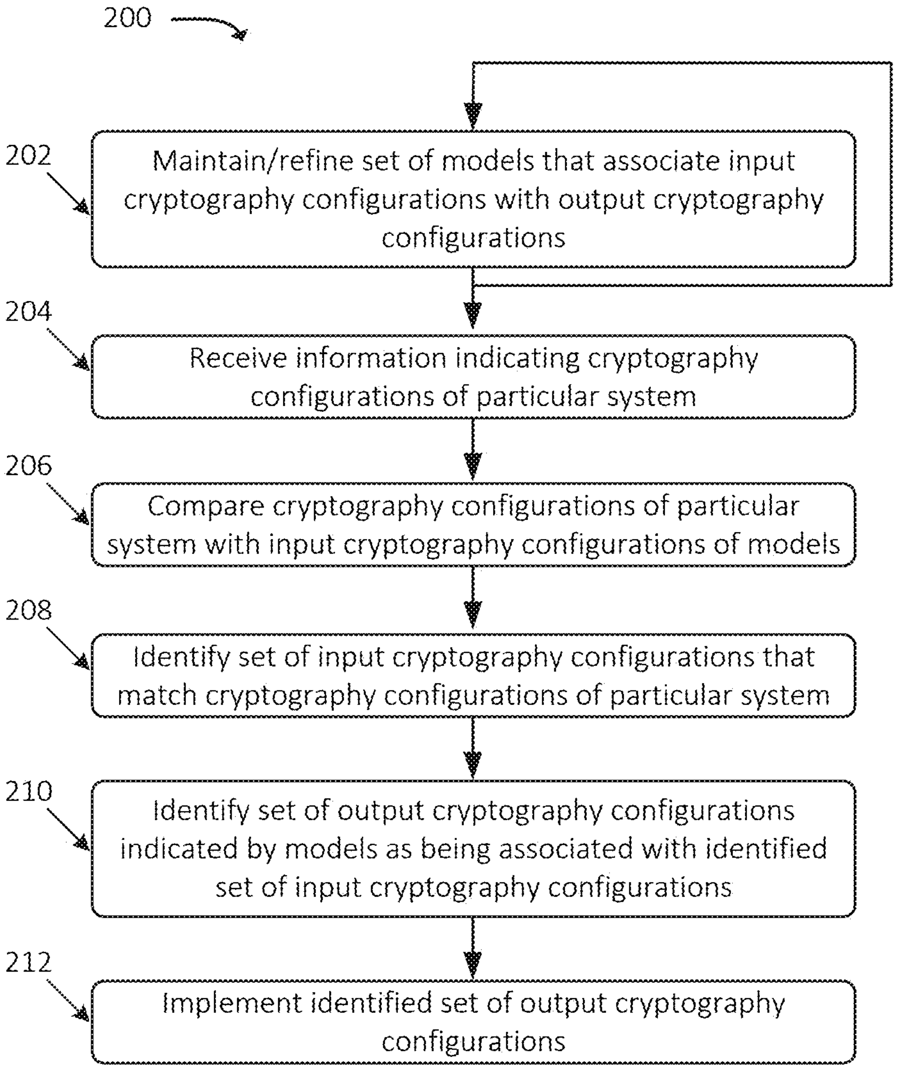
FIG. 2 illustrates an example process for utilizing automated techniques to refine the cryptography techniques employed by a system, such as a wireless network, in accordance with some embodiments.

FIG. 2 illustrates an example process 200 for utilizing automated techniques to refine the cryptography techniques employed by a system, such as a wireless network. In some embodiments, some or all of process 200 may be performed by COS 109. In some embodiments, one or more other devices may perform some or all of process 200 in concert with, and/or in lieu of, COS 109, such as CAS 105.

As shown, process 200 may include maintaining and/or refining (at 202) a set of models that associate respective sets of cryptography configurations (e.g., sets of input cryptography configurations) with respective sets of improved or modified cryptography configurations (e.g., sets of output cryptography configurations). As noted above, the input and/or output sets of cryptography configurations of one or more cryptography models 111 may each include information defining cryptography techniques (e.g., encryption techniques, authentication techniques, etc., and/or parameters of such cryptography techniques (e.g., a quantity of bits used for performing cryptography techniques for encryption, key generation, etc.). Additionally, or alternatively, a given cryptography configuration may include information specifying particular APIs, SDKs, firmware, etc. that can be used to implement particular cryptography techniques. In some embodiments, the cryptography configurations may include information specifying hardware requirements, resource requirements, or the like. In some embodiments, the cryptography configurations may include authentication keys, certificates, etc. that are used to communicate with one or more particular devices or systems (e.g., one or more specific NFs 101 and/or types of NFs 101 of a wireless network). As noted above, different sets of output cryptography configurations may be associated with the same set of input cryptography configurations with differing hardware capabilities and/or other factors. In some embodiments, COS 109 may utilize AI/ML techniques to train, refine, etc. such models to optimize factors such as enhanced security, hardware resource utilization, etc.

Process 200 may further include receiving (at 204) information indicating cryptography configurations of a particular system. For example, as discussed above, COS 109 may receive information specifying cryptography configurations, such as information indicating particular cryptography techniques, APIs, SDKs, cryptography parameters, etc. implemented by a given system. In the examples provided above, the cryptography configurations pertain to cryptography techniques implemented by a wireless network that includes NMS 103 and one or more NFs 101. In some embodiments, the cryptography configuration information may further include additional details regarding the system, such as hardware capabilities, quantities of devices, communication pathways between such devices, and so on.

Process 200 may additionally include comparing (at 206) cryptography configurations of the particular system with input cryptography configurations of one or more models. For example, COS 109 may perform a similarity analysis to identify a matching input cryptography configuration, as specified in one or more cryptography models 111, with the configuration of the system (e.g., of NMS 103 and/or one or more NFs 101).

Process 200 may also include identifying (at 208) a set of input cryptography configurations that match the cryptography configurations of the particular system. For example, COS 109 may identify a measure of similarity between the cryptography configurations of the particular system and one or more input cryptography configurations of the cryptography models 111, in order to identify a most closely matching input cryptography configuration as indicated in one or more cryptography models 111.

Process 200 may further include identifying (at 210) a set of output cryptography configurations that are indicated in the models as being associated with the identified set of input cryptography configurations. For example, COS 109 may identify a particular output cryptography configuration (e.g., an optimized, modified, updated, etc. set of cryptography configurations) that is indicated by one or more cryptography models 111 as being associated with the identified set of input cryptography configurations. In some embodiments, COS 109 may further identify the particular output cryptography configuration based on one or more other factors, such as hardware capabilities of the system to be optimized (e.g., hardware capabilities of NMS 103 and/or NFs 101, in the examples discussed above).

In some embodiments, COS 109 may identify the particular output cryptography configuration based on security and/or risk factors, performance and/or resource consumption factors, or the like. For example, a particular NF 101 and/or type of NF 101 may be associated with QoS policies, Service Level Agreements ("SLAs"), performance thresholds, or the like, and COS 109 may identify a particular cryptography model 111 that is associated with a score, indicator, etc. of performance and/or resource consumption commensurate with the QoS policies, SLAs, performance thresholds, etc. associated with NF 101. For example, if NF 101 is associated with relatively stringent QOS parameters (e.g., relatively high throughput thresholds, relatively low latency thresholds, etc.), COS 109 may identify a particular cryptography model 111 that optimizes QoS parameters (e.g., is associated with a relatively high score for performance). In a similar manner, COS 109 may identify cryptography models 111 that optimize different factors for different NFs 101 (e.g., where such factors may be indicated in the cryptography ontology for such NFs 101, may be specified as part of a request for a new cryptography configuration for one or more NFs 101, and/or may otherwise be determined by COS 109). In this manner, COS 109 may automatically identify an optimized set of cryptography configurations to implement at the system, which meets the goals, constraints, policies, etc. of the system.

Process 200 may additionally include implementing (at 212) the identified set of output cryptography configurations. For example, COS 109 may output the optimized set of cryptography configurations, such as to NMS 103, which may include outputting one or more packages, files, images, etc. to NMS 103. Additionally, or alternatively, COS 109 may output one or more links, references, labels, identifiers, etc. based on which NMS 103 may obtain or retrieve packages, files, images, etc. in order to implement the optimized set of cryptography configurations. NMS 103 and/or NFs 101 may accordingly replace or modify their existing cryptography configurations with the new cryptography configurations indicated by COS 109, thus enhancing the security and overall operation of NMS 103 and/or NFs 101. In some scenarios, replacing or modifying an existing cryptography configuration may include installing, maintaining, etc. an updated set of certificates, authentication keys, etc. that are used to communicate with other NFs 101. For example, an updated cryptography configuration may remove a previously maintained key or certificate used to communicate with another NF 101, where such communications would be unauthorized or otherwise violate policies or protocols. As another example, an updated cryptography configuration may add or update a previously maintained key or certificate used to communicate with another NF 101, where such communications are authorized or specified by one or more policies or protocols.

Figure 3:
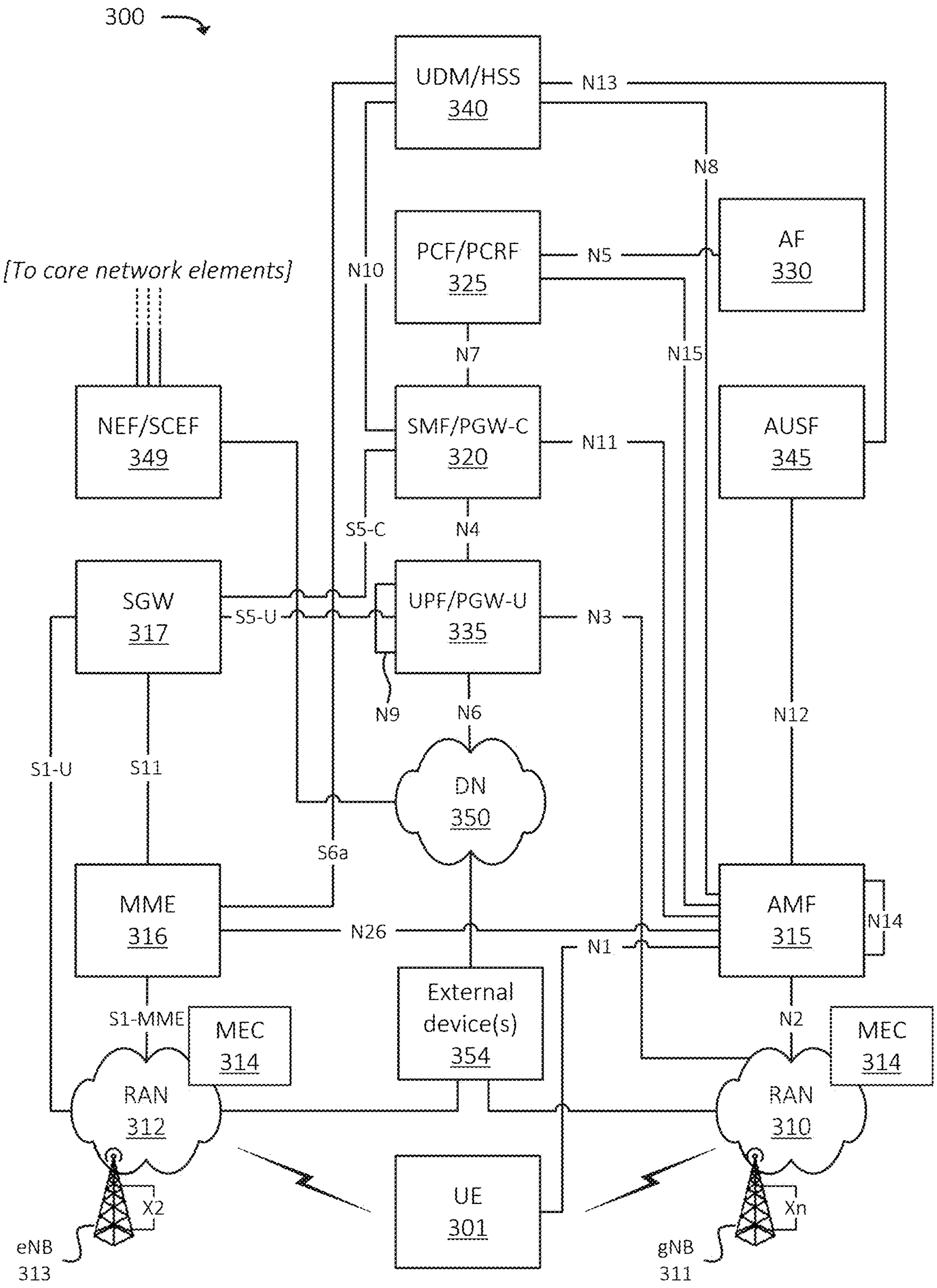
FIGS. 3 and 4 illustrate example environments in which one or more embodiments, described herein, may be implemented.

FIG. 3 illustrates an example environment 300, in which one or more embodiments may be implemented. In some embodiments, environment 300 may correspond to a Fifth Generation ("5G") network, and/or may include elements of a 5G network. In some embodiments, environment 300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 300 may represent or may include a 5G core ("5GC"). As shown, environment 300 may include UE 301, RAN 310 (which may include one or more Next Generation Node Bs ("gNBs") 311), RAN 312 (which may include one or more evolved Node Bs ("eNBs") 313), and various network functions such as Access and Mobility Management Function ("AMF") 315, Mobility Management Entity ("MME") 316, Serving Gateway ("SGW") 317, Session Management Function ("SMF")/Packet Data Network ("PDN") Gateway ("PGW")-Control plane function ("PGW-C") 320, Policy Control Function ("PCF")/Policy Charging and Rules Function ("PCRF") 325, Application Function ("AF") 330, User Plane Function ("UPF")/PGW-User plane function ("PGW-U") 335, Unified Data Management ("UDM")/Home Subscriber Server ("HSS") 340, Authentication Server Function ("AUSF") 345, and Network Exposure Function ("NEF")/Service Capability Exposure Function ("SCEF") 349. Environment 300 may also include one or more networks, such as Data Network ("DN") 350. Environment 300 may include one or more additional devices or systems communicatively coupled to one or more networks (e.g., DN 350), such as one or more external devices 354.

The example shown in FIG. 3 illustrates one instance of each network component or function (e.g., one instance of SMF/PGW-C 320, PCF/PCRF 325, UPF/PGW-U 335, UDM/HSS 340, and/or AUSF 345). In practice, environment 300 may include multiple instances of such components or functions. For example, in some embodiments, environment 300 may include multiple "slices" of a core network, where each slice includes a discrete and/or logical set of network functions (e.g., one slice may include a first instance of AMF 315, SMF/PGW-C 320, PCF/PCRF 325, and/or UPF/PGW-U 335, while another slice may include a second instance of AMF 315, SMF/PGW-C 320, PCF/PCRF 325, and/or UPF/PGW-U 335). The different slices may provide differentiated levels of service, such as service in accordance with different QoS parameters.

The quantity of devices and/or networks, illustrated in FIG. 3, is provided for explanatory purposes only. In practice, environment 300 may include additional devices and/or networks, fewer devices and/or networks, different devices and/or networks, or differently arranged devices and/or networks than illustrated in FIG. 3. For example, while not shown, environment 300 may include devices that facilitate or enable communication between various components shown in environment 300, such as routers, modems, gateways, switches, hubs, etc. In some implementations, one or more devices of environment 300 may be physically integrated in, and/or may be physically attached to, one or more other devices of environment 300. Alternatively, or additionally, one or more of the devices of environment 300 may perform one or more network functions described as being performed by another one or more of the devices of environment 300.

Additionally, one or more elements of environment 300 may be implemented in a virtualized and/or containerized manner. For example, one or more of the elements of environment 300 may be implemented by one or more Virtualized Network Functions ("VNFs"), Cloud-Native Network Functions ("CNFs"), etc. In some embodiments, one or more of the elements of environment 300 may include, may implement, may be implemented by, and/or may otherwise be associated with one or more NFs 101. In such embodiments, environment 300 may include, may implement, and/or may be communicatively coupled to an orchestration platform that provisions hardware resources, installs containers or applications, performs load balancing, and/or otherwise manages the deployment of such elements of environment 300. In some embodiments, such orchestration and/or management of such elements of environment 300 may be performed by, or in conjunction with, the open-source Kubernetes® application programming interface ("API") or some other suitable virtualization, containerization, and/or orchestration system.

Elements of environment 300 may interconnect with each other and/or other devices via wired connections, wireless connections, or a combination of wired and wireless connections. Examples of interfaces or communication pathways between the elements of environment 300, as shown in FIG. 3, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an Soa interface, an S11 interface, and/or one or more other interfaces. Such interfaces may include interfaces not explicitly shown in FIG. 3, such as Service-Based Interfaces ("SBIs"), including an Namf interface, an Nudm interface, an Npcf interface, an Nupf interface, an Nnef interface, an Nsmf interface, and/or one or more other SBIs.

UE 301 may include a computation and communication device, such as a wireless mobile communication device that is capable of communicating with RAN 310, RAN 312, and/or DN 350. UE 301 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 301 may send traffic to and/or receive traffic (e.g., user plane traffic) from DN 350 via RAN 310, RAN 312, and/or UPF/PGW-U 335.

RAN 310 may be, or may include, a 5G RAN that implements a 5G RAT and that includes one or more base stations (e.g., one or more gNBs 311), via which UE 301 may communicate with one or more other elements of environment 300. UE 301 may communicate with RAN 310 via an air interface (e.g., as provided by gNB 311). For instance, RAN 310 may receive traffic (e.g., user plane traffic such as voice call traffic, data traffic, messaging traffic, etc.) from UE 301 via the air interface, and may communicate the traffic to UPF/PGW-U 335 and/or one or more other devices or networks. Further, RAN 310 may receive signaling traffic, control plane traffic, etc. from UE 301 via the air interface, and may communicate such signaling traffic, control plane traffic, etc. to AMF 315 and/or one or more other devices or networks. Additionally, RAN 310 may receive traffic intended for UE 301 (e.g., from UPF/PGW-U 335, AMF 315, and/or one or more other devices or networks) and may communicate the traffic to UE 301 via the air interface.

RAN 312 may be, or may include, an LTE RAN that implements an LTE RAT and that includes one or more base stations (e.g., one or more eNBs 313), via which UE 301 may communicate with one or more other elements of environment 300. UE 301 may communicate with RAN 312 via an air interface (e.g., as provided by eNB 313). For instance, RAN 312 may receive traffic (e.g., user plane traffic such as voice call traffic, data traffic, messaging traffic, signaling traffic, etc.) from UE 301 via the air interface, and may communicate the traffic to UPF/PGW-U 335 (e.g., via SGW 317) and/or one or more other devices or networks. Further, RAN 312 may receive signaling traffic, control plane traffic, etc. from UE 301 via the air interface, and may communicate such signaling traffic, control plane traffic, etc. to MME 316 and/or one or more other devices or networks. Additionally, RAN 312 may receive traffic intended for UE 301 (e.g., from UPF/PGW-U 335, MME 316, SGW 317, and/or one or more other devices or networks) and may communicate the traffic to UE 301 via the air interface.

One or more RANs of environment 300 (e.g., RAN 310 and/or RAN 312) may include, may implement, and/or may otherwise be communicatively coupled to one or more edge computing devices, such as one or more Multi-Access/Mobile Edge Computing ("MEC") devices (referred to sometimes herein simply as a "MECs") 314. MECs 314 may be co-located with wireless network infrastructure equipment of RANs 310 and/or 312 (e.g., one or more gNBs 311 and/or one or more eNBs 313, respectively). Additionally, or alternatively, MECs 314 may otherwise be associated with geographical regions (e.g., coverage areas) of wireless network infrastructure equipment of RANs 310 and/or 312. In some embodiments, one or more MECs 314 may be implemented by the same set of hardware resources, the same set of devices, etc. that implement wireless network infrastructure equipment of RANs 310 and/or 312. In some embodiments, one or more MECs 314 may be implemented by different hardware resources, a different set of devices, etc. from hardware resources or devices that implement wireless network infrastructure equipment of RANs 310 and/or 312. In some embodiments, MECs 314 may be communicatively coupled to wireless network infrastructure equipment of RANs 310 and/or 312 (e.g., via a high-speed and/or low-latency link such as a physical wired interface, a high-speed and/or low-latency wireless interface, or some other suitable communication pathway).

MECs 314 may include hardware resources (e.g., configurable or provisionable hardware resources) that may be configured to provide services and/or otherwise process traffic to and/or from UE 301, via RAN 310 and/or 312. For example, RAN 310 and/or 312 may route some traffic from UE 301 (e.g., traffic associated with one or more particular services, applications, application types, etc.) to a respective MEC 314 instead of to core network elements of 300 (e.g., UPF/PGW-U 335). MEC 314 may accordingly provide services to UE 301 by processing such traffic, performing one or more computations based on the received traffic, and providing traffic to UE 301 via RAN 310 and/or 312. MEC 314 may include, and/or may implement, some or all of the functionality described above with respect to UPF/PGW-U 335, AF 330, one or more application servers, and/or one or more other devices, systems, VNFs, CNFs, etc. In this manner, ultra-low latency services may be provided to UE 301, as traffic does not need to traverse links (e.g., backhaul links) between RAN 310 and/or 312 and the core network.

AMF 315 may include one or more devices, systems, VNFs, CNFs, etc., that perform operations to register UE 301 with the 5G network, to establish bearer channels associated with a session with UE 301, to hand off UE 301 from the 5G network to another network, to hand off UE 301 from the other network to the 5G network, manage mobility of UE 301 between RANs 310 and/or gNBs 311, and/or to perform other operations. In some embodiments, the 5G network may include multiple AMFs 315, which communicate with each other via the N14 interface (denoted in FIG. 3 by the line marked "N14" originating and terminating at AMF 315).

MME 316 may include one or more devices, systems, VNFs, CNFs, etc., that perform operations to register UE 301 with the EPC, to establish bearer channels associated with a session with UE 301, to hand off UE 301 from the EPC to another network, to hand off UE 301 from another network to the EPC, manage mobility of UE 301 between RANs 312 and/or eNBs 313, and/or to perform other operations.

SGW 317 may include one or more devices, systems, VNFs, CNFs, etc., that aggregate traffic received from one or more eNBs 313 and send the aggregated traffic to an external network or device via UPF/PGW-U 335. Additionally, SGW 317 may aggregate traffic received from one or more UPF/PGW-Us 335 and may send the aggregated traffic to one or more eNBs 313. SGW 317 may operate as an anchor for the user plane during inter-eNB handovers and as an anchor for mobility between different telecommunication networks or RANs (e.g., RANs 310 and 312).

SMF/PGW-C 320 may include one or more devices, systems, VNFs, CNFs, etc., that gather, process, store, and/or provide information in a manner described herein. SMF/PGW-C 320 may, for example, facilitate the establishment of communication sessions on behalf of UE 301. In some embodiments, the establishment of communications sessions may be performed in accordance with one or more policies provided by PCF/PCRF 325.

PCF/PCRF 325 may include one or more devices, systems, VNFs, CNFs, etc., that aggregate information to and from the 5G network and/or other sources. PCF/PCRF 325 may receive information regarding policies and/or subscriptions from one or more sources, such as subscriber databases and/or from one or more users (such as, for example, an administrator associated with PCF/PCRF 325).

AF 330 may include one or more devices, systems, VNFs, CNFs, etc., that receive, store, and/or provide information that may be used in determining parameters (e.g., quality of service parameters, charging parameters, or the like) for certain applications.

UPF/PGW-U 335 may include one or more devices, systems, VNFs, CNFs, etc., that receive, store, and/or provide data (e.g., user plane data). For example, UPF/PGW-U 335 may receive user plane data (e.g., voice call traffic, data traffic, etc.), destined for UE 301, from DN 350, and may forward the user plane data toward UE 301 (e.g., via RAN 310, SMF/PGW-C 320, and/or one or more other devices). In some embodiments, multiple instances of UPF/PGW-U 335 may be deployed (e.g., in different geographical locations), and the delivery of content to UE 301 may be coordinated via the N9 interface (e.g., as denoted in FIG. 3 by the line marked "N9" originating and terminating at UPF/PGW-U 335). Similarly, UPF/PGW-U 335 may receive traffic from UE 301 (e.g., via RAN 310, RAN 312, SMF/PGW-C 320, and/or one or more other devices), and may forward the traffic toward DN 350. In some embodiments, UPF/PGW-U 335 may communicate (e.g., via the N4 interface) with SMF/PGW-C 320, regarding user plane data processed by UPF/PGW-U 335.

UDM/HSS 340 and AUSF 345 may include one or more devices, systems, VNFs, CNFs, etc., that manage, update, and/or store, in one or more memory devices associated with AUSF 345 and/or UDM/HSS 340, profile information associated with a subscriber. In some embodiments, UDM/HSS 340 may include, may implement, may be communicatively coupled to, and/or may otherwise be associated with some other type of repository or database, such as a Unified Data Repository ("UDR"). AUSF 345 and/or UDM/HSS 340 may perform authentication, authorization, and/or accounting operations associated with one or more UEs 301 and/or one or more communication sessions associated with one or more UEs 301.

DN 350 may include one or more wired and/or wireless networks. For example, DN 350 may include an Internet Protocol ("IP")-based PDN, a wide area network ("WAN") such as the Internet, a private enterprise network, and/or one or more other networks. UE 301 may communicate, through DN 350, with data servers, other UEs 301, and/or to other servers or applications that are coupled to DN 350. DN 350 may be connected to one or more other networks, such as a public switched telephone network ("PSTN"), a public land mobile network ("PLMN"), and/or another network. DN 350 may be connected to one or more devices, such as content providers, applications, web servers, and/or other devices, with which UE 301 may communicate.

External devices 354 may include one or more devices or systems that communicate with UE 301 via DN 350 and one or more elements of 300 (e.g., via UPF/PGW-U 335). In some embodiments, external devices 354 may include, may implement, and/or may otherwise be associated with NMS 103, CAS 105, and/or COS 109. External devices 354 may include, for example, one or more application servers, content provider systems, web servers, or the like. External devices 354 may, for example, implement "server-side" applications that communicate with "client-side" applications executed by UE 301. External devices 354 may provide services to UE 301 such as gaming services, videoconferencing services, messaging services, email services, web services, and/or other types of services.

In some embodiments, external devices 354 may communicate with one or more elements of environment 300 (e.g., core network elements) via NEF/SCEF 349. NEF/SCEF 349 may include one or more devices, systems, VNFs, CNFs, etc. that provide access to information, APIs, and/or other operations or mechanisms of one or more core network elements to devices or systems that are external to the core network (e.g., to external device 354 via DN 350). NEF/SCEF 349 may maintain authorization and/or authentication information associated with such external devices or systems, such that NEF/SCEF 349 is able to provide information, that is authorized to be provided, to the external devices or systems. For example, a given external device 354 may request particular information associated with one or more core network elements. NEF/SCEF 349 may authenticate the request and/or otherwise verify that external device 354 is authorized to receive the information, and may request, obtain, or otherwise receive the information from the one or more core network elements. In some embodiments, NEF/SCEF 349 may include, may implement, may be implemented by, may be communicatively coupled to, and/or may otherwise be associated with a Security Edge Protection Proxy ("SEPP"), which may perform some or all of the functions discussed above. External device 354 may, in some situations, subscribe to particular types of requested information provided by the one or more core network elements, and the one or more core network elements may provide (e.g., "push") the requested information to NEF/SCEF 349 (e.g., in a periodic or otherwise ongoing basis).

In some embodiments, external devices 354 may communicate with one or more elements of RAN 310 and/or 312 via an API or other suitable interface. For example, a given external device 354 may provide instructions, requests, etc. to RAN 310 and/or 312 to provide one or more services via one or more respective MECs 314. In some embodiments, such instructions, requests, etc. may include QoS parameters, Service Level Agreements ("SLAs"), etc. (e.g., maximum latency thresholds, minimum throughput thresholds, etc.) associated with the services.

Figure 4:
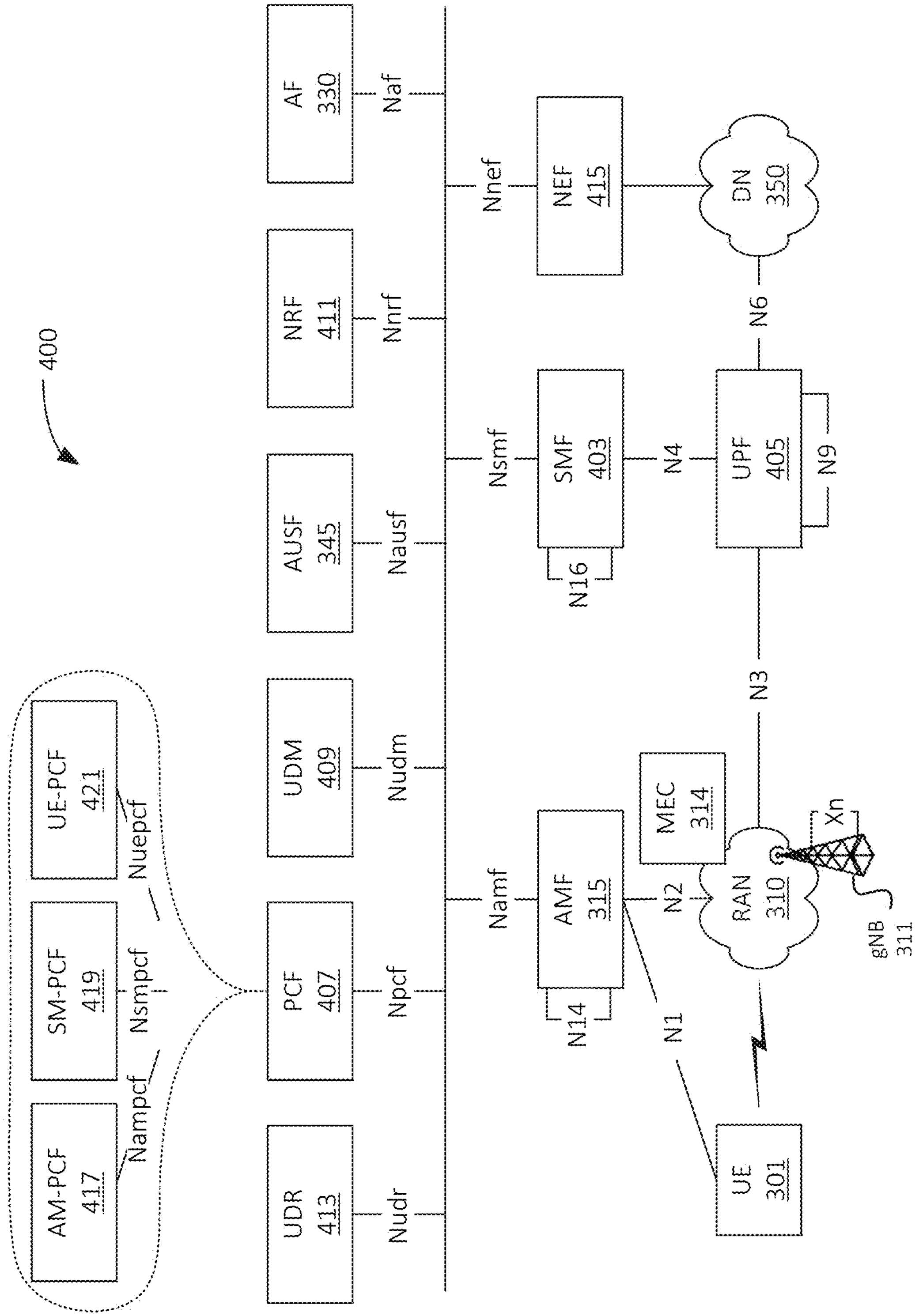

FIG. 4 illustrates another example environment 400, in which one or more embodiments may be implemented. In some embodiments, environment 400 may correspond to a 5G network, and/or may include elements of a 5G network. In some embodiments, environment 400 may correspond to a 5G SA architecture. In some embodiments, environment 400 may include a 5GC, in which 5GC network elements perform one or more operations described herein.

As shown, environment 400 may include UE 301, RAN 310 (which may include one or more gNBs 311 or other types of wireless network infrastructure) and various network functions, which may be implemented as VNFs, CNFs, etc. Such network functions may include AMF 315, SMF 403, UPF 405, PCF 407, UDM 409, AUSF 345, Network Repository Function ("NRF") 411, AF 330, UDR 413, and NEF 415. Environment 400 may also include or may be communicatively coupled to one or more networks, such as DN 350.

The example shown in FIG. 4 illustrates one instance of each network component or function (e.g., one instance of SMF 403, UPF 405, PCF 407, UDM 409, AUSF 345, etc.). In practice, environment 400 may include multiple instances of such components or functions. For example, in some embodiments, environment 400 may include multiple "slices" of a core network, where each slice includes a discrete and/or logical set of network functions (e.g., one slice may include a first instance of SMF 403, PCF 407, UPF 405, etc., while another slice may include a second instance of SMF 403, PCF 407, UPF 405, etc.). Additionally, or alternatively, one or more of the network functions of environment 400 may implement multiple network slices. The different slices may provide differentiated levels of service, such as service in accordance with different QoS parameters.

The quantity of devices and/or networks, illustrated in FIG. 4, is provided for explanatory purposes only. In practice, environment 400 may include additional devices and/or networks, fewer devices and/or networks, different devices and/or networks, or differently arranged devices and/or networks than illustrated in FIG. 4. For example, while not shown, environment 400 may include devices that facilitate or enable communication between various components shown in environment 400, such as routers, modems, gateways, switches, hubs, etc. In some implementations, one or more devices of environment 400 may be physically integrated in, and/or may be physically attached to, one or more other devices of environment 400. Alternatively, or additionally, one or more of the devices of environment 400 may perform one or more network functions described as being performed by another one or more of the devices of environment 400.

Elements of environment 400 may interconnect with each other and/or other devices via wired connections, wireless connections, or a combination of wired and wireless connections. Examples of interfaces or communication pathways between the elements of environment 400, as shown in FIG. 4, may include interfaces shown in FIG. 4 and/or one or more interfaces not explicitly shown in FIG. 4. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 400 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 315), an Nudm interface (e.g., indicating communications to be routed to UDM 409), an Npcf interface, an Nupf interface, an Nnef interface, an Nsmf interface, an Nnrf interface, an Nudr interface, an Naf interface, and/or one or more other SBIs.

UPF 405 may include one or more devices, systems, VNFs, CNFs, etc., that receive, route, process, and/or forward traffic (e.g., user plane traffic). As discussed above, UPF 405 may communicate with UE 301 via one or more communication sessions, such as PDU sessions. Such PDU sessions may be associated with a particular network slice or other suitable QoS parameters, as noted above. UPF 405 may receive downlink user plane traffic (e.g., voice call traffic, data traffic, etc. destined for UE 301) from DN 350, and may forward the downlink user plane traffic toward UE 301 (e.g., via RAN 310). In some embodiments, multiple UPFs 405 may be deployed (e.g., in different geographical locations), and the delivery of content to UE 301 may be coordinated via the N9 interface. Similarly, UPF 405 may receive uplink traffic from UE 301 (e.g., via RAN 310), and may forward the traffic toward DN 350. In some embodiments, UPF 405 may implement, may be implemented by, may be communicatively coupled to, and/or may otherwise be associated with UPF/PGW-U 335. In some embodiments, UPF 405 may communicate (e.g., via the N4 interface) with SMF 403, regarding user plane data processed by UPF 405 (e.g., to provide analytics or reporting information, to receive policy and/or authorization information, etc.).

PCF 407 may include one or more devices, systems, VNFs, CNFs, etc., that aggregate, derive, generate, etc. policy information associated with the 5GC and/or UEs 301 that communicate via the 5GC and/or RAN 310. PCF 407 may receive information regarding policies and/or subscriptions from one or more sources, such as subscriber databases (e.g., UDM 409, UDR 413, etc.), and/or from one or more users such as, for example, an administrator associated with PCF 407. In some embodiments, the functionality of PCF 407 may be split into multiple network functions or subsystems, such as access and mobility PCF ("AM-PCF") 417, session management PCF ("SM-PCF") 419, UE PCF ("UE-PCF") 421, and so on. Such different "split" PCFs may be associated with respective SBIs (e.g., AM-PCF 417 may be associated with an Nampcf SBI, SM-PCF 419 may be associated with an Nsmpcf SBI, UE-PCF 421 may be associated with an Nuepcf SBI, and so on) via which other network functions may communicate with the split PCFs. The split PCFs may maintain information regarding policies associated with different devices, systems, and/or network functions.

NRF 411 may include one or more devices, systems, VNFs, CNFs, etc. that maintain routing and/or network topology information associated with the 5GC. For example, NRF 411 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 413 may include one or more devices, systems, VNFs, CNFs, etc. that provide user and/or subscriber information, based on which PCF 407 and/or other elements of environment 400 may determine access policies, QoS policies, charging policies, or the like. In some embodiments, UDR 413 may receive such information from UDM 409 and/or one or more other sources.

NEF 415 may include one or more devices, systems, VNFs, CNFs, etc. that provide access to information, APIs, and/or other operations or mechanisms of the 5GC to devices or systems that are external to the 5GC. NEF 415 may maintain authorization and/or authentication information associated with such external devices or systems, such that NEF 415 is able to provide information, that is authorized to be provided, to the external devices or systems. Such information may be received from other network functions of the 5GC (e.g., as authorized by an administrator or other suitable entity associated with the 5GC), such as SMF 403, UPF 405, a charging function ("CHF") of the 5GC, and/or other suitable network function. NEF 415 may communicate with external devices or systems (e.g., external devices 354) via DN 350 and/or other suitable communication pathways.

While environment 400 is described in the context of a 5GC, as noted above, environment 400 may, in some embodiments, include or implement one or more other types of core networks. For example, in some embodiments, environment 400 may be or may include a converged packet core, in which one or more elements may perform some or all of the functionality of one or more 5GC network functions and/or one or more EPC network functions. For example, in some embodiments, AMF 315 may include, may implement, may be implemented by, and/or may otherwise be associated with MME 316; SMF 403 may include, may implement, may be implemented by, and/or may otherwise be associated with SGW 317; PCF 407 may include, may implement, may be implemented by, and/or may otherwise be associated with a PCRF (e.g., PCF/PCRF 325); NEF 415 may include, may implement, may be implemented by, and/or may otherwise be associated with a SCEF (e.g., NEF/SCEF 349); and so on.

Figure 5:
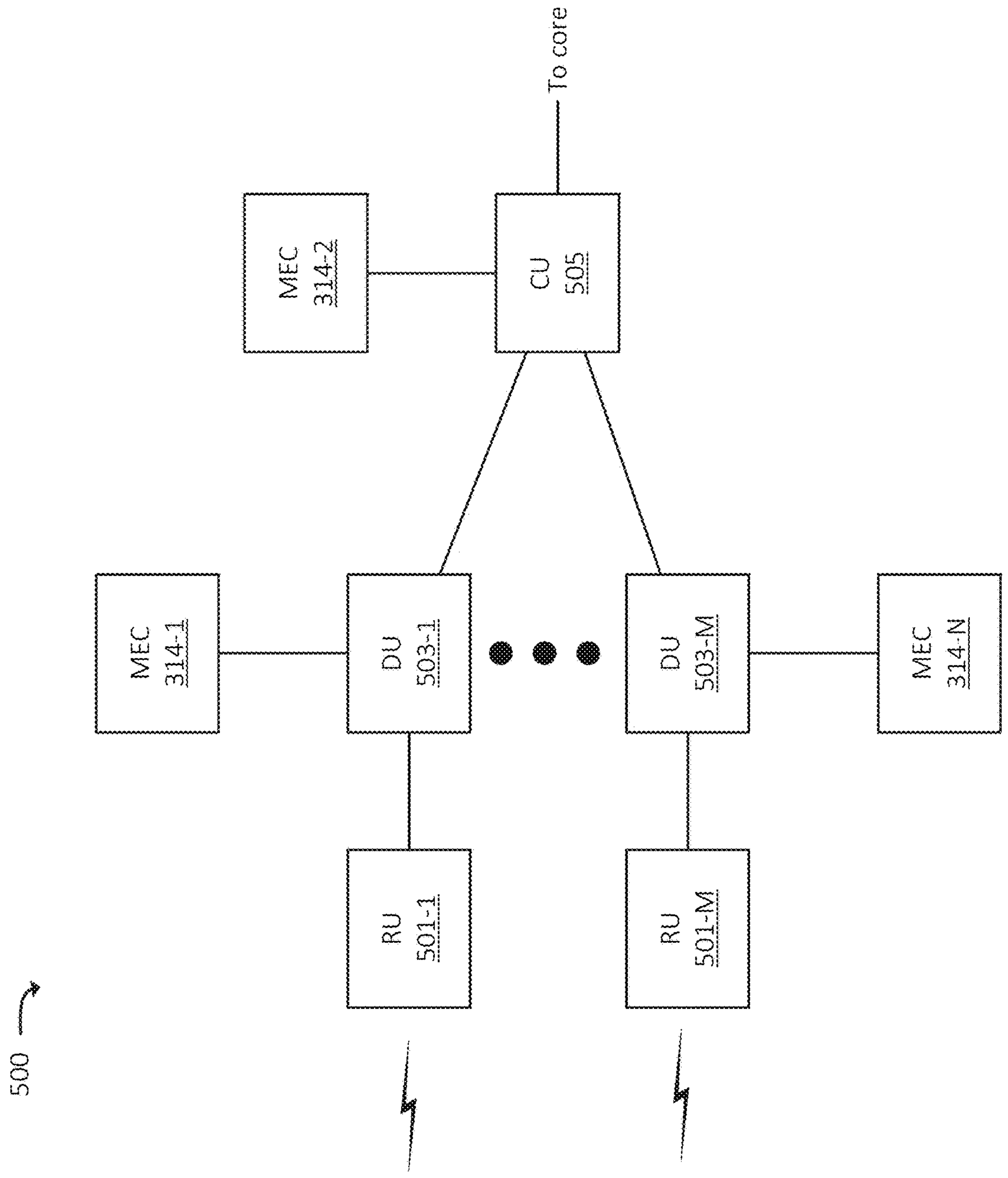
FIG. 5 illustrates an example arrangement of a radio access network ("RAN"), in accordance with some embodiments.

FIG. 5 illustrates an example RAN environment 500, which may be included in and/or implemented by one or more RANs (e.g., RAN 310 or some other RAN). In some embodiments, a particular RAN 310 may include one RAN environment 500. In some embodiments, a particular RAN 310 may include multiple RAN environments 500. In some embodiments, RAN environment 500 may correspond to a particular gNB 311 of RAN 310. In some embodiments, RAN environment 500 may correspond to multiple gNBs 311. In some embodiments, RAN environment 500 may correspond to one or more other types of base stations of one or more other types of RANs. As shown, RAN environment 500 may include Central Unit ("CU") 505, one or more Distributed Units ("DUs") 503-1 through 503-M (referred to individually as "DU 503," or collectively as "DUs 503"), and one or more Radio Units ("RUs") 501-1 through 501-M (referred to individually as "RU 501," or collectively as "RUs 501").

CU 505 may communicate with a core of a wireless network (e.g., may communicate with one or more of the devices or systems described above with respect to FIG. 4, such as AMF 315 and/or UPF 405) and/or some other device or system such as MEC 314. In the uplink direction (e.g., for traffic from UEs 301 to a core network), CU 505 may aggregate traffic from DUs 503, and forward the aggregated traffic to the core network. In some embodiments, CU 505 may receive traffic according to a given protocol (e.g., Radio Link Control ("RLC") traffic) from DUs 503, and may perform higher-layer processing (e.g., may aggregate/process RLC packets and generate Packet Data Convergence Protocol ("PDCP") packets based on the RLC packets) on the traffic received from DUs 503.

CU 505 may receive downlink traffic (e.g., traffic from the core network, traffic from a given MEC 314, etc.) for a particular UE 301, and may determine which DU(s) 503 should receive the downlink traffic. DU 503 may include one or more devices that transmit traffic between a core network (e.g., via CU 505) and UE 301 (e.g., via a respective RU 501). DU 503 may, for example, receive traffic from RU 501 at a first layer (e.g., physical ("PHY") layer traffic, or lower PHY layer traffic), and may process/aggregate the traffic to a second layer (e.g., upper PHY and/or RLC). DU 503 may receive traffic from CU 505 at the second layer, may process the traffic to the first layer, and provide the processed traffic to a respective RU 501 for transmission to UE 301.

RU 501 may include hardware circuitry (e.g., one or more RF transceivers, antennas, radios, and/or other suitable hardware) to communicate wirelessly (e.g., via an RF interface) with one or more UEs 301, one or more other DUs 503 (e.g., via RUs 501 associated with DUs 503), and/or any other suitable type of device. In the uplink direction, RU 501 may receive traffic from UE 301 and/or another DU 503 via the RF interface and may provide the traffic to DU 503. In the downlink direction, RU 501 may receive traffic from DU 503, and may provide the traffic to UE 301 and/or another DU 503.

One or more elements of RAN environment 500 may, in some embodiments, be communicatively coupled to one or more MECs 314. For example, DU 503-1 may be communicatively coupled to MEC 314-1, DU 503-M may be communicatively coupled to MEC 314-N, CU 505 may be communicatively coupled to MEC 314-2, and so on. MECs 314 may include hardware resources (e.g., configurable or provisionable hardware resources) that may be configured to provide services and/or otherwise process traffic to and/or from UE 301, via a respective RU 501.

For example, DU 503-1 may route some traffic, from UE 301, to MEC 314-1 instead of to a core network via CU 505. MEC 314-1 may process the traffic, perform one or more computations based on the received traffic, and may provide traffic to UE 301 via RU 501-1. As discussed above, MEC 314 may include, and/or may implement, some or all of the functionality described above with respect to UPF 405, AF 330, and/or one or more other devices, systems, VNFs, CNFs, etc. In this manner, ultra-low latency services may be provided to UE 301, as traffic does not need to traverse DU 503, CU 505, links between DU 503 and CU 505, and an intervening backhaul network between RAN environment 500 and the core network.

Figure 6:
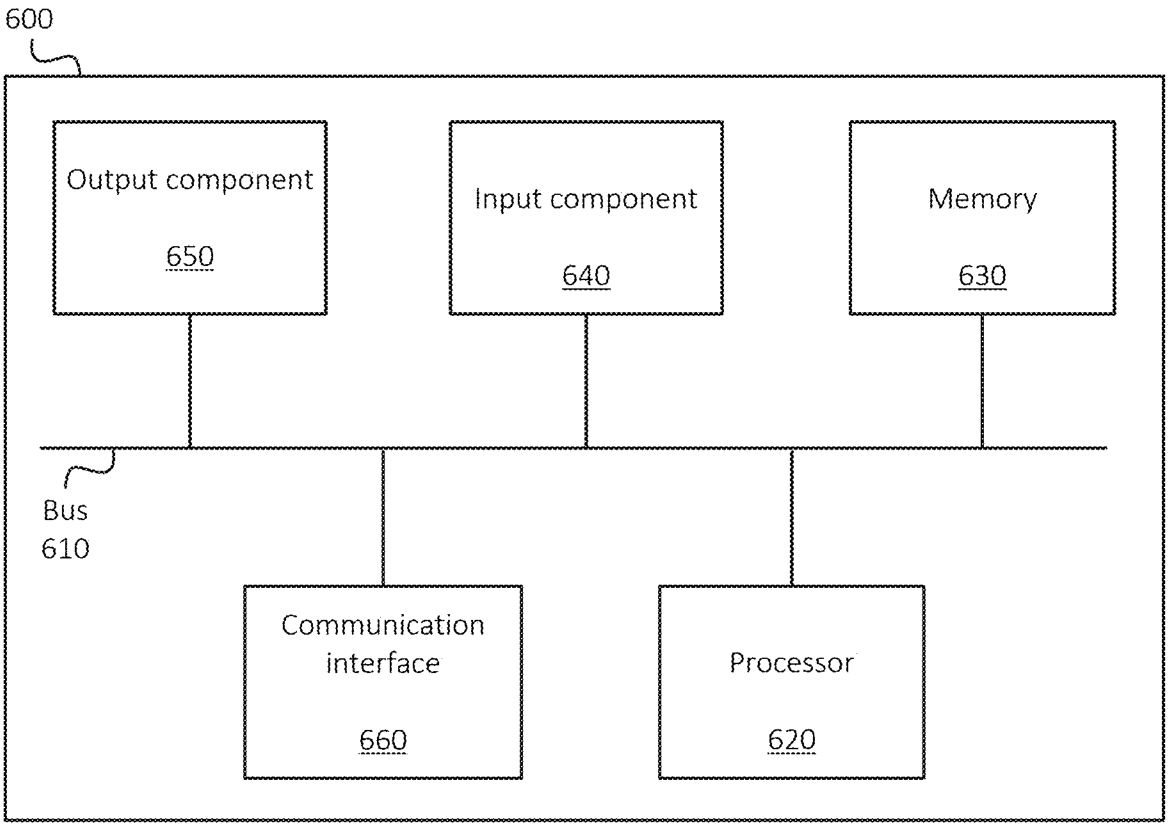
FIG. 6 illustrates example components of one or more devices, in accordance with one or more embodiments described herein.

FIG. 6 illustrates example components of device 600. One or more of the devices described above may include one or more devices 600. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, a set of provisioned hardware resources of a cloud computing system, or other suitable type of hardware that interprets and/or executes instructions (e.g., processor-executable instructions). In some embodiments, processor 620 may be or may include one or more hardware processors. Memory 630 may include any type of dynamic storage device that may store information and instructions for execution by processor 620, and/or any type of non-volatile storage device that may store information for use by processor 620.

Input component 640 may include a mechanism that permits an operator to input information to device 600 and/or otherwise receives or detects input from a source external to input component 640, such as a touchpad, a touchscreen, a keyboard, a keypad, a button, a switch, a microphone or other audio input component, etc. In some embodiments, input component 640 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems (e.g., via RAN 310, RAN 312, DN 350, etc.). For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 600 may include more than one communication interface 660. For instance, device 600 may include an optical interface, a wireless interface, an Ethernet interface, and/or one or more other interfaces.

Device 600 may perform certain operations relating to one or more processes described above. Device 600 may perform these operations in response to processor 620 executing instructions, such as software instructions, processor-executable instructions, etc. stored in a computer-readable medium, such as memory 630. A computer-readable medium may be defined as a non-transitory memory device. A memory device may include space within a single physical memory device or spread across multiple physical memory devices. The instructions may be read into memory 630 from another computer-readable medium or from another device. The instructions stored in memory 630 may be processor-executable instructions that cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1 and 2), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

maintain a set of models that associate a plurality of sets of input cryptography configurations with respective sets of output cryptography configurations;

receive information indicating:

a first set of cryptography configurations associated with a particular system, hardware resource parameters associated with the particular system, and Quality of Service ("QoS") parameters associated with the particular system;

compare the first set of cryptography configurations with one or more sets of input cryptography configurations of the set of models;

identify, based on the comparing, a particular set of input cryptography configurations included in the set of models;

identify a particular set of output cryptography configurations that are indicated in the set of models as being associated with the identified particular set of input cryptography configurations, the hardware resource parameters associated with the particular system, and the QoS parameters associated with the particular system; and provide the particular set of output cryptography configurations to the particular system, wherein the particular system modifies or replaces the first set of cryptography configurations with the particular set of output cryptography configurations.

2. The device of claim 1, wherein the set of models include one or more artificial intelligence/machine learning ("AI/ML") models.

3. The device of claim 2, wherein the associations between the plurality of sets of input cryptography configurations and the respective sets of output cryptography configurations are determined based on a training operation of the one or more AI/ML models.

4. The device of claim 1, wherein the first set of cryptography configurations includes a first set of cryptography algorithms, wherein the particular set of output cryptography configurations includes a different second set of cryptography algorithms.

5. The device of claim 1, wherein the particular system includes one or more Network Functions ("NFs") of a wireless network.

6. The device of claim 5, wherein the particular system further includes a network management system that is communicatively coupled to the one or more NFs, wherein providing the particular set of output cryptography configurations to the particular system includes providing the particular set of output cryptography configurations to the network management system.

7. The device of claim 6, wherein the network management system instructs the one or more NFs to implement the particular set of output cryptography configurations.

8. A non-transitory computer-readable medium, storing a plurality of processor-executable instructions to:

maintain a set of models that associate a plurality of sets of input cryptography configurations with respective sets of output cryptography configurations;

receive information indicating:

a first set of cryptography configurations associated with a particular system, hardware resource parameters associated with the particular system, and Quality of Service ("QoS") parameters associated with the particular system;

compare the first set of cryptography configurations with one or more sets of input cryptography configurations of the set of models;

identify, based on the comparing, a particular set of input cryptography configurations included in the set of models;

identify a particular set of output cryptography configurations that are indicated in the set of models as being associated with the identified particular set of input cryptography configurations, the hardware resource parameters associated with the particular system, and the QoS parameters associated with the particular system; and provide the particular set of output cryptography configurations to the particular system, wherein the particular system modifies or replaces the first set of cryptography configurations with the particular set of output cryptography configurations.

9. The non-transitory computer-readable medium of claim 8, wherein the set of models include one or more artificial intelligence/machine learning ("AI/ML") models.

10. The non-transitory computer-readable medium of claim 9, wherein the associations between the plurality of sets of input cryptography configurations and the respective sets of output cryptography configurations are determined based on a training operation of the one or more AI/ML models.

11. The non-transitory computer-readable medium of claim 8, wherein the first set of cryptography configurations includes a first set of cryptography algorithms, wherein the particular set of output cryptography configurations includes a different second set of cryptography algorithms.

12. The non-transitory computer-readable medium of claim 8, wherein the particular system includes one or more Network Functions ("NFs") of a wireless network.

13. The non-transitory computer-readable medium of claim 12, wherein the particular system further includes a network management system that is communicatively coupled to the one or more NFs, wherein providing the particular set of output cryptography configurations to the particular system includes providing the particular set of output cryptography configurations to the network management system.

14. The non-transitory computer-readable medium of claim 13, wherein the network management system instructs the one or more NFs to implement the particular set of output cryptography configurations.

15. A method, comprising:

maintaining a set of models that associate a plurality of sets of input cryptography configurations with respective sets of output cryptography configurations;

receiving information indicating:

a first set of cryptography configurations associated with a particular system, hardware resource parameters associated with the particular system, and Quality of Service ("QoS") parameters associated with the particular system;

comparing the first set of cryptography configurations with one or more sets of input cryptography configurations of the set of models;

identifying, based on the comparing, a particular set of input cryptography configurations included in the set of models;

identifying a particular set of output cryptography configurations that are indicated in the set of models as being associated with the identified particular set of input cryptography configurations, the hardware resource parameters associated with the particular system, and the QoS parameters associated with the particular system; and providing the particular set of output cryptography configurations to the particular system, wherein the particular system modifies or replaces the first set of cryptography configurations with the particular set of output cryptography configurations.

16. The method of claim 15, wherein the set of models include one or more artificial intelligence/machine learning ("AI/ML") models, wherein the associations between the plurality of sets of input cryptography configurations and the respective sets of output cryptography configurations are determined based on a training operation of the one or more AI/ML models.

17. The method of claim 15, wherein the first set of cryptography configurations includes a first set of cryptography algorithms, wherein the particular set of output cryptography configurations includes a different second set of cryptography algorithms.

18. The method of claim 15, wherein the particular system includes one or more Network Functions ("NFs") of a wireless network.

19. The method of claim 18, wherein the particular system further includes a network management system that is communicatively coupled to the one or more NFs, wherein providing the particular set of output cryptography configurations to the particular system includes providing the particular set of output cryptography configurations to the network management system.

20. The method of claim 19, wherein the network management system instructs the one or more NFs to implement the particular set of output cryptography configurations.

* * * * *